(12) United States Patent
Rinehart

(10) Patent No.: US 6,966,596 B1
(45) Date of Patent: Nov. 22, 2005

(54) LOUVERED TAILGATE

(76) Inventor: Ron L. Rinehart, 8733 E. Boston St., Wichita, KS (US) 67207

(*) Notice: Subject to any disclaimer, the term of this patent is extended or adjusted under 35 U.S.C. 154(b) by 0 days.

(21) Appl. No.: 11/022,608

(22) Filed: Dec. 28, 2004

(51) Int. Cl.⁷ ............................................. B62D 25/00
(52) U.S. Cl. ................... 296/57.1; 296/180.5
(58) Field of Search .......................... 296/57.1, 180.1, 296/180.5

(56) References Cited

U.S. PATENT DOCUMENTS 4,165,118 A  8/1979  Jensen 4,867,499 A * 9/1989 Stephan et al. ............... 296/50

* cited by examiner

Primary Examiner—Joseph D. Pape
(74) Attorney, Agent, or Firm—Crossley Patent Law; Mark A. Crossley

(57) ABSTRACT

A pickup truck louvered tailgate with controllably positioned louvers. Louver positioning is controlled by a lever in the tailgate operating a rack and pinion apparatus within. Further embodiments offer cab controls for remotely positioning the levers by the addition of a reversible electric motor or pneumatic drive. Louvers are sturdy and fully closable and also capable of opening either partially or fully to further reduce aerodynamic drag. Original manufacturer tailgate mounts and pivots are used.

10 Claims, 3 Drawing Sheets

LOUVERED TAILGATE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Many offerings exist by which the aerodynamic drag of a pickup tailgate may be reduced. The devices offered, however, do not solve all problems associated with lessened aerodynamic drag and cargo carrying integrity. When cargo items must be contained, a strong and rigid tailgate is needed to insure safety with no loss of cargo items. When fuel mileage is a greater concern than cargo, the most useful tailgate is one which can be influenced to reduce drag.

FIELD OF THE INVENTION

The invention relates to pickup truck tailgates and more specifically to a pickup truck louvered tailgate with controllable louvers.

DESCRIPTION OF THE PRIOR ART

While the above-described devices fulfill their respective and particular objects and requirements, they do not describe a pickup truck louvered tailgate that provides for the advantages of the present invention; therefore, a need exists for an improved pickup truck louvered tailgate, particularly one that includes operational control from either the tailgate or from within the cab. In this respect, the present invention substantially departs from the conventional concepts and designs of the prior art.

SUMMARY OF THE INVENTION

In view of the foregoing disadvantages inherent in the known types of pickup truck tailgates now present in the prior art, the pickup truck louvered tailgate overcomes the above-mentioned disadvantages and drawbacks of the prior art. As such, the general purpose of the pickup truck louvered tailgate, described subsequently in greater detail, is to provide a pickup truck louvered tailgate which has all of the advantages of the prior art mentioned heretofore and many novel features that result in an improved pickup truck louvered tailgate which is not anticipated, rendered obvious, suggested, or even implied by the prior art, either alone or in combination thereof.

The pickup truck louvered tailgate is comprised of a substantially parallelepiped rectangular frame surrounding a plurality of parallel louvers within the frame bounds. Preferably louvers are horizontally disposed; however, another embodiment of the invention provides vertically disposed louvers. The louvers are, in the preferred embodiment, pivoted about louver shafts which are in turn anchored in opposing lateral members of the frame. In the horizontal plane, louvers are adjusted by a user to be fully open, partially open, or even fully closed. Adjustment is accomplished via a hand lever in the tailgate frame or via remote controls within the pickup cab. The most basic form of the invention offers only hand lever controls for the louver pivotal positioning. In more deluxe offerings of the invention, reversible electric motor or pneumatic drive embodiments are offered, with the accompanying motor or pneumatic mechanism interacting with the lever. With the offering of electric or pneumatic auxiliary controls, the lever still overrides the controls such that, even with failure of pneumatics or electric controls, the lever is still functional in controlling the louver positioning. Electric and pneumatic functions are controlled remotely within the pickup cab so that a cab occupant is able to open and close the louvers without having to do so manually at the tailgate.

The rack and pinion apparatus of the mechanism provides a hand lever with lever pinion teeth which communicate directly with the rack teeth. The rack is positioned within a lateral member. A rack guide slot is disposed within the seamless junction of upper horizontal frame member and lateral member. The accompanying rack guide slot is disposed directly below in the seamless junction of the lower horizontal frame member and the same lateral member. The movement of the rack is further influenced frictionally by slide bushings within the rack guide slots so that positioning of the louvers remains as chosen until a user wishes change. This insures that high wind velocities encountered in driving will not change the louvers' positioning.

As wind resistance plays a role in fuel mileage, opening the louvers of the pickup truck allows free passage of air through the tailgate, thereby negating a degree of wind drag normally encountered. Reduced aerodynamic drag provides increased fuel mileage. Also, if a load is carried, one which needs confinement due to smaller items and the like, the louvers are selectively closed to prevent loss of any items carried. Of importance, though, is the strength of the louvers. The louvers will contain heavy cargo items whether open or closed. With these options, a pickup truck can gain fuel mileage when needed and also contain cargo when needed, varying the degree of louver opening as needed. Further, the louvers of the invention are rigidly formed of metal, plastics, composites, or a combination thereof. Louver integrity is further enhanced by use of the strong and direct rack and pinion apparatus.

The invention is offered as a direct original manufacturer replacement part, fitting the pickup bed exactly as an original tailgate does and utilizing the same hinge and latch designs. While a typical pickup tailgate is approximately 22–24" in height, width may often vary from 55–65 inches. The pickup truck louvered tailgate, however, preferably remains at no less than 4" thick, with louver depth being no less than that dimension.

Thus has been broadly outlined the more important features of the pickup truck louvered tailgate so that the detailed description thereof that follows may be better understood and in order that the present contribution to the art may be better appreciated.

Numerous objects, features and advantages of the pickup truck louvered tailgate will be readily apparent to those of ordinary skill in the art upon reading the following detailed description of presently preferred, but nonetheless illustrative, embodiments of the Pickup truck louvered tailgate when taken in conjunction with the accompanying drawings.

In this respect, before explaining the current embodiments of the Pickup truck louvered tailgate in detail, it is to be understood that the invention is not limited in its application to the details of construction and arrangements of the components set forth in the following description or illustration. The invention is capable of other embodiments and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the Pickup truck louvered tailgate. It is therefore important that the claims be regarded as including such equivalent constructions insofar as they do not depart from the spirit and scope of the present invention.

A primary object, then, of the pickup truck louvered tailgate is to provide a tailgate that is substantially formed of selectively opened louvers.

A further object of the pickup truck louvered tailgate is to improve fuel mileage.

An additional object of the pickup truck louvered tailgate is to securely contain cargo.

And, it is an object of the pickup truck louvered tailgate to provide remote cab adjustment of the louver positioning.

These together with additional objects of the pickup truck louvered tailgate, along with various novel features that characterize the invention are particularly pointed out in the claims forming a part of this disclosure. For better understanding of the pickup truck louvered tailgate, its operating advantages and specific objects attained by its uses, refer to the accompanying drawings and description.

DETAILED DESCRIPTION OF THE PREFERRED EMBODIMENT

Figure 1:
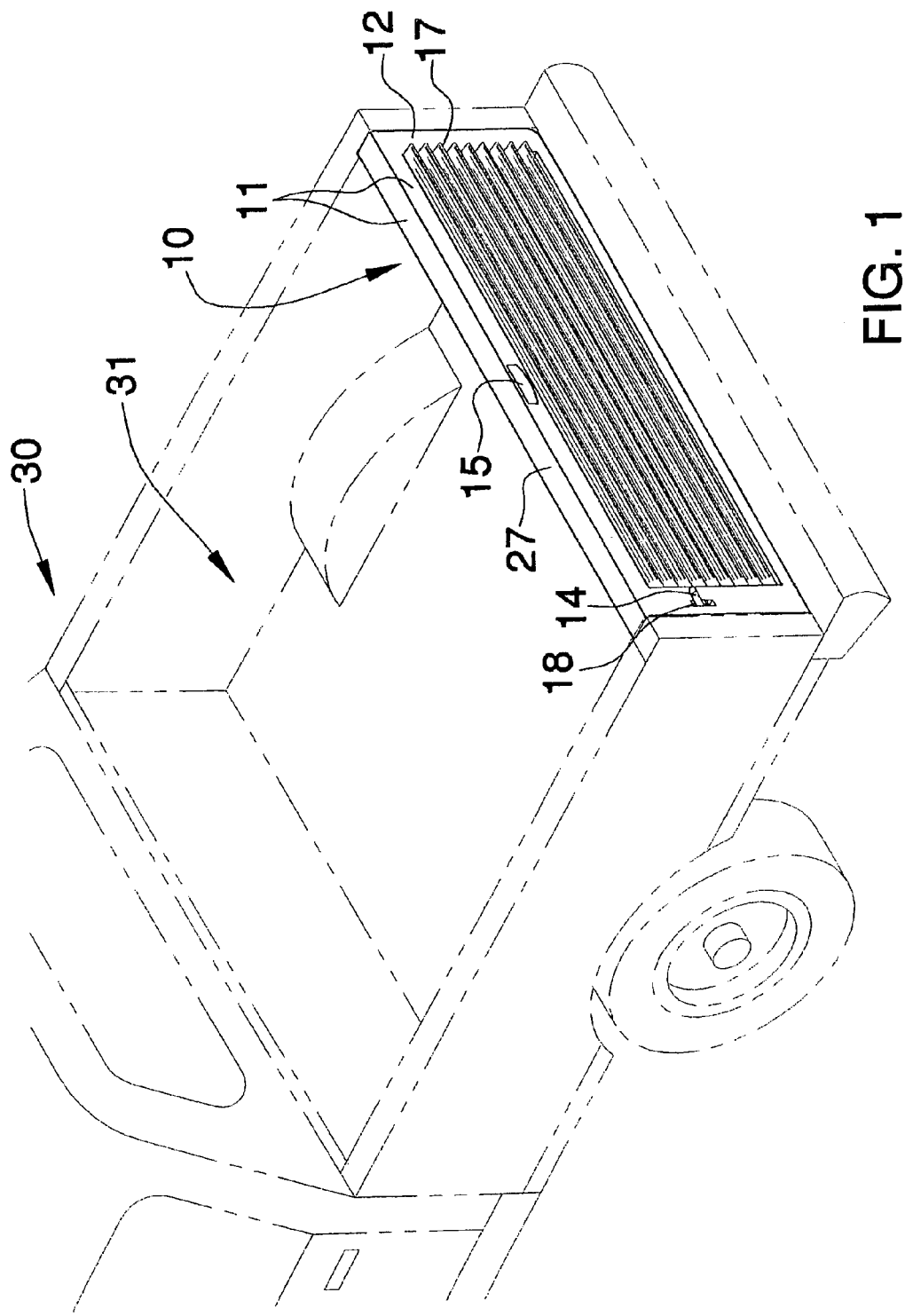
FIG. 1 is a perspective view of the pickup truck louvered tailgate, mounted to a typical truck bed.
Figure 2:
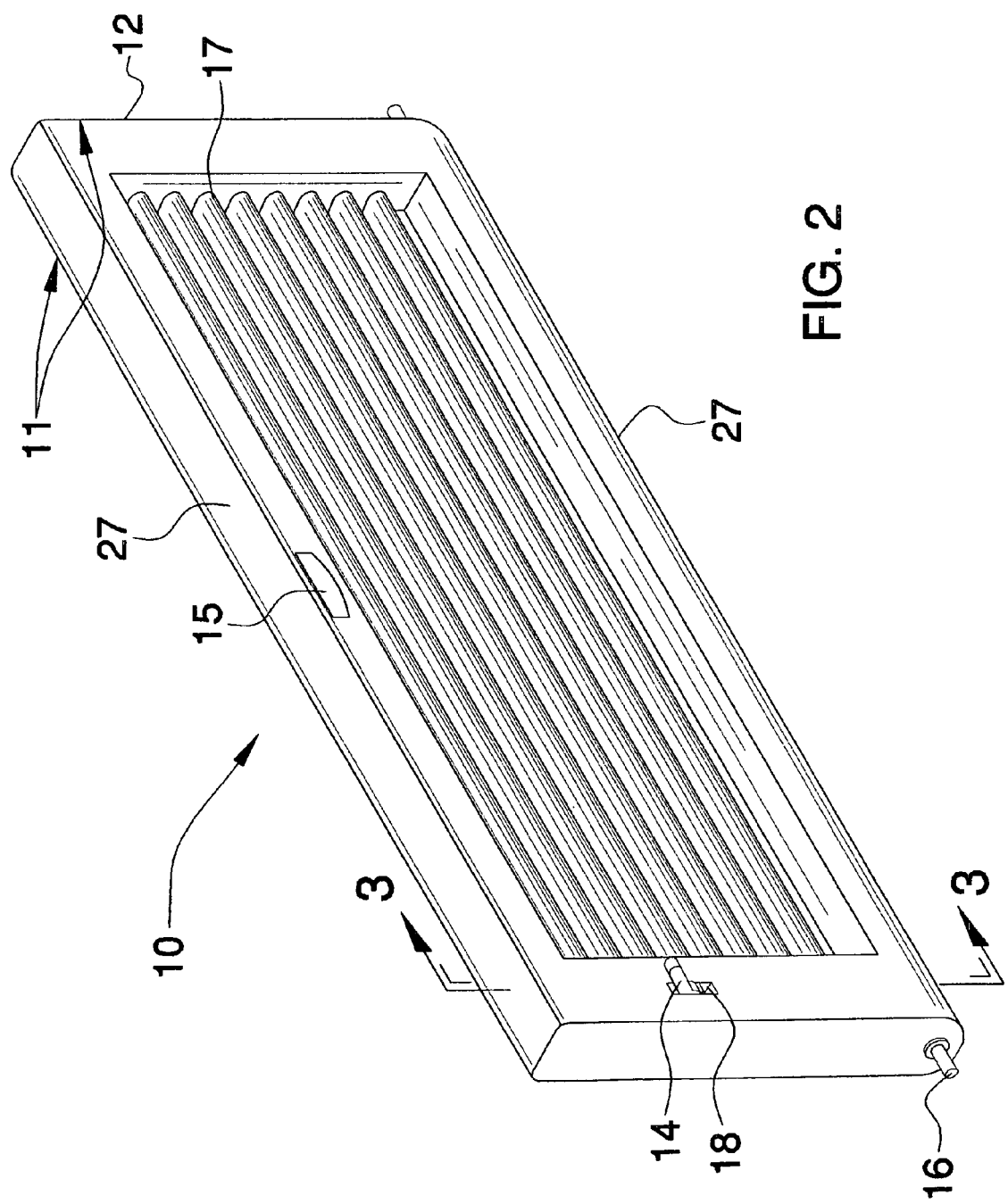
FIG. 2 is a perspective view of the pickup truck louvered tailgate.
Figure 3:
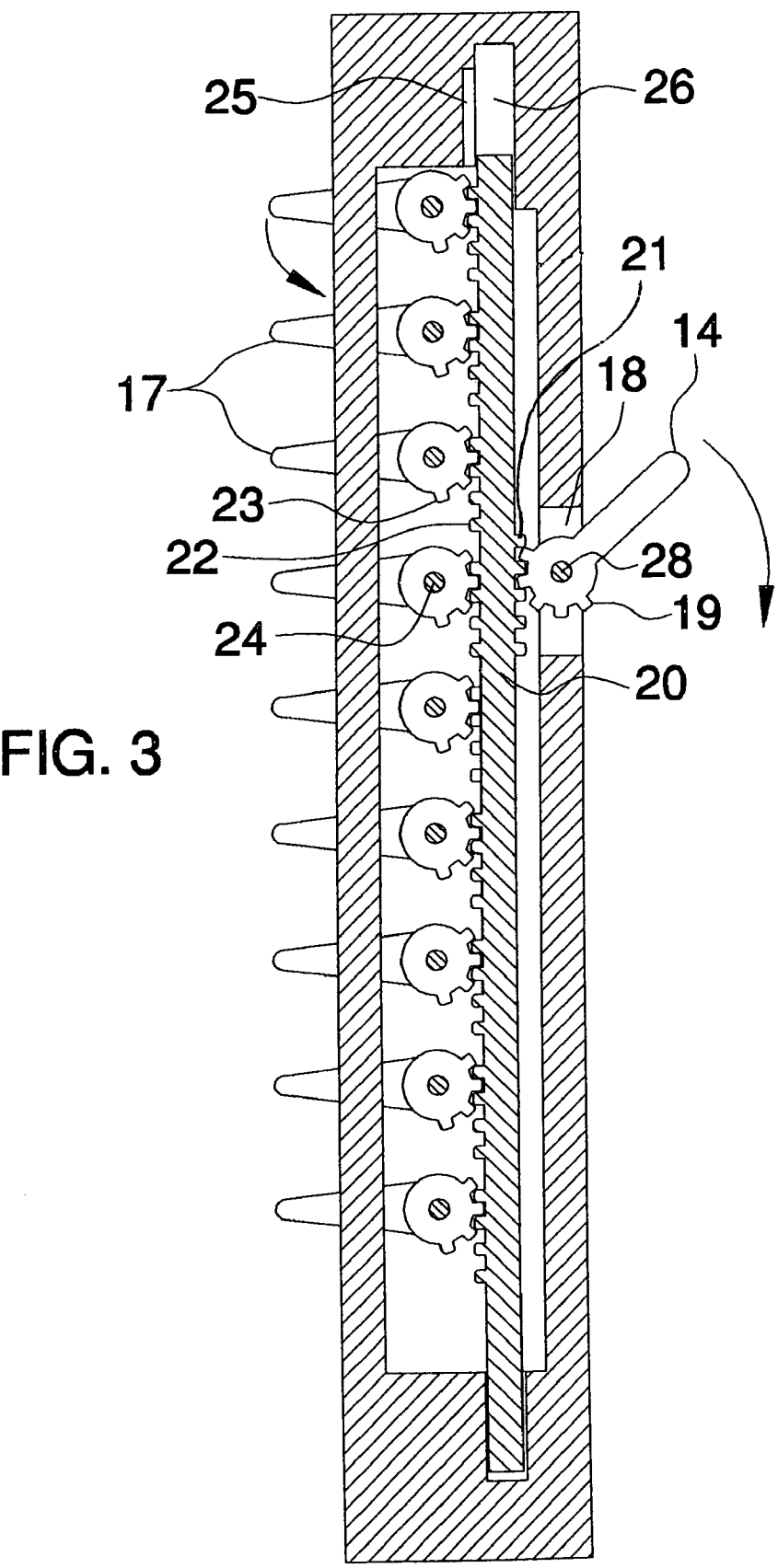
FIG. 3 is a cross sectional view of the pickup truck louvered tailgate, illustrating the rack and pinion apparatus.

With reference now to the drawings, and in particular FIGS. 1–3 thereof, the preferred embodiment of the pickup truck louvered tailgate employing the principles and concepts of the present invention and generally designated by the reference number 10 will be described.

Referring to FIG. 1, the pickup truck louvered tailgate 10 comprises a substantially rectangular parallelepiped tailgate frame 11 comprised of opposite lateral frame members 12 and opposite upper and lower horizontal frame members 27. Louvers 17 are horizontally disposed between opposing lateral members 12 and parallel to upper and lower members 27. Louvers 17 are selectively and pivotally opened and closed to provide either blockage or passage of air. Louvers 17 are shown in the open position. When closed, louvers 17 form a solid blockade within frame 11, retaining any cargo and blocking air flow. Latch handle 15 is centrally and outwardly disposed within upper horizontal member 27. Tailgate mount/pivot 16 provides location and pivotal capability to louvered tailgate 10. Mount/pivot 16 is typical of conventional pickup truck manufacturers. Mount/pivot 16 varies somewhat from one manufacturer to the next (not shown). Typically, though, tailgates function in like manner in allowing pivoting tailgate 10 to pivotally open and close. Tailgate 10 pivot and latch mechanisms will therefore vary but be typical of existing manufacturer designs, typically utilizing the like of latch handle 15. Referring to FIG. 2, tailgate mount/pivot 16 is typical of some General Motors designs.

Referring to FIG. 3, the cross sectional view of the louvered tailgate 10 further comprises a rack and pinion apparatus. Rack 20 resides within the frame side lateral member 12 of frame 11. Rack guide slots 26 are disposed vertically within members 27 and lateral members 12, where members 27 and 12 seamlessly meet. Opposing members 27 extend fully across frame 11 and are an apparent seamless continuation of frame 11 as it is comprised, at top and bottom of members 27 and on either end of opposing lateral members 12. Free movement of rack 20 is frictionally resisted by slide bushing 25 inserted within rack guide slot 26. Lever opening 18 disposed within the driver side lateral member 12 and houses hand lever 14. Hand lever 14 pivots up and down within opening 18. In still further embodiments, the hand lever 14 is accompanied by an electric motor (not shown). The motor is controlled remotely within the cab of a pickup 30. In the event of motor failure, the hand lever 14 can still be used to operate the louvers. In still another embodiment, the hand lever 14 is accompanied by pneumatic mechanism (not shown) for controlling lever 14 positioning. The pneumatic controls are remotely located within the cab of a pickup 30 and may be overridden by hand lever 14, if desired or needed.

In operation of the preferred embodiment, a user (not shown) grasps hand lever 14 for pivoting either upward or downward. Lever 14 is anchored within lateral member 12 by lever pivot 28. Upward movement of lever 14 pivots louvers 17 downwardly, thereby closing the tailgate louvers 17 and blocking the flow of air or any equipment or items (not shown) within the pickup bed 31. Louvers 17 are held in place and pivot about louver shafts 24. Shafts 24 are fixedly disposed in opposing lateral members 12. Pivoting lever 14 upwardly causes lever pinion teeth 19 to move rack teeth 21 downward, hence moving rack 20 downward. Downward movement of rack 20 moves drive teeth 22 downward, thereby pivoting louver teeth 23 in an opposite direction. Pivoting louver teeth 23 upwardly causes the louvers 17 to pivot upwardly, thereby opening the louvers 17 and allowing air to pass through with little resistance. Slide bushings 25 offer frictional resistance to the movement of rack 20 such that rack 20 remains in the position into which it is selectively placed.

With respect to the above description then, it is to be realized that the optimum dimensional relationships for the parts of the pickup truck louvered tailgate, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A pickup truck louvered tailgate comprising:
   a plurality of parallel pivotal louvers disposed within an outer substantially parallelepiped tailgate frame, the louvers selectively pivoting to allow blockage or passage of air through the louvers and hence the tailgate;
   means for controlling the pivoting of the louvers;
   means for pivoting the tailgate from a conventional open to closed position with regard to a pickup bed, the pivoting means pivoting from a bottom of the tailgate frame;
   means for latching the tailgate, the latching means further comprising a release handle accessibly disposed within the outer frame of the tailgate.

2. The invention in claim 1 wherein the means for pivoting the tailgate is identical to that of original pickup manufacturers.

3. The invention in claim 2 wherein the means for selectively pivoting the louvers from open to closed comprises a rack and pinion apparatus.

4. The invention in claim 3 wherein the rack and pinion apparatus comprises:
   a lever disposed within and outwardly accessible from a tailgate frame member, the lever selectively pivoting about a lever pivot, the lever further comprising lever pinion teeth,
   the rack further comprising, on one side, rack teeth interacting with the lever pinion teeth, the rack sliding within rack guide slots within the same tailgate frame member, the rack comprising, on an opposite side, drive teeth;
   each of the louvers pivoting about a louver shaft, the louver shaft rigidly attached on one end within the tailgate frame member comprising the rack, an opposite end of the louver shaft rigidly attached within an opposing tailgate frame member, the louvers further comprising louver teeth interacting with the rack drive teeth whereby movement of the lever moves the rack, thereby opening and closing the louvers.

5. The invention in claim 4 wherein at least one rack guide slot further comprises a slide bushing, the bushing frictionally resisting movement of the rack.

6. The invention in claim 5 wherein the louvers are vertically disposed.

7. The invention in claim 5 wherein the louvers are horizontally disposed.

8. The invention in claim 7 wherein the louvers are no less than 4 inches in depth.

9. A pickup truck louvered tailgate comprising:
   a plurality of parallel pivotal louvers disposed within an outer substantially parallelepiped tailgate frame;
   a rack and pinion apparatus for selectively pivoting the louvers to allow blockage or passage of air through the louvers and hence the tailgate, the rack and pinion apparatus comprising:
   a lever disposed within and outwardly accessible from a tailgate frame member, the lever selectively pivoting about a lever pivot, the lever further comprising lever pinion teeth,
   the rack further comprising, on one side, rack teeth interacting with the lever pinion teeth, the rack sliding within rack guide slots within the same tailgate frame member, the rack comprising, on an opposite side, drive teeth;
   each of the louvers pivoting about a louver shaft, the louver shaft rigidly attached on one end within the tailgate frame member comprising the rack, an opposite end of the louver shaft rigidly attached within an opposing tailgate frame member, the louvers further comprising louver teeth interacting with the rack drive teeth whereby movement of the lever moves the rack, thereby opening and closing the louvers;
   means for pivoting the tailgate from a conventional open to closed position with regard to a pickup bed, the pivoting means pivoting from a bottom of the tailgate frame;
   means for latching the tailgate, the latching means further comprising a release handle accessibly disposed within the outer frame of the tailgate.

10. A pickup truck louvered tailgate comprising:
   a plurality of horizontal, parallel pivotal louvers disposed within an outer substantially parallelepiped tailgate frame, the frame and louvers at least 4 inches in depth;
   a rack and pinion apparatus for selectively pivoting the louvers to allow blockage or passage of air through the louvers and hence the tailgate, the rack and pinion apparatus comprising:
   a lever disposed within and outwardly accessible from a tailgate frame member, the lever selectively pivoting about a lever pivot, the lever further comprising lever pinion teeth.

* * * * *